United States Patent

[11] 3,575,449

| [72] | Inventor | Charles W. Browning |
| | | 4645 E. 57th St., Tulsa, Okla. 74135 |
| [21] | Appl. No. | 821,658 |
| [22] | Filed | May 5, 1969 |
| [45] | Patented | Apr. 20, 1971 |

[54] KNOT-TYING DEVICE AND METHOD
9 Claims, 17 Drawing Figs.

[52] U.S. Cl. ...................................................... 289/1.5, 289/17
[51] Int. Cl. ...................................................... B65h 69/04
[50] Field of Search .......................................... 289/1.2, 1.5, 17; 81/43

[56] References Cited
UNITED STATES PATENTS

| 2,532,972 | 12/1950 | Vertin | 81/43X |
| 3,101,964 | 8/1963 | Reaser | 289/17 |
| 3,131,957 | 5/1964 | Musto | 289/17 |
| 3,180,665 | 4/1965 | Bartlett | 289/17 |
| 3,321,225 | 5/1967 | Miller | 289/17 |
| 3,396,998 | 8/1968 | Scoville | 289/17 |
| 3,481,641 | 12/1969 | Berger et al. | 81/43X |

Primary Examiner—Louis K. Rimrodt
Attorney—Wilson & Geppert

ABSTRACT: A knot-tying device and method, especially for use in the knotting of monofilament line to fishing lures or hooks, with the device including a casing housing a pushrod or stem which is secured to or integral with a pair of outwardly sprung blades having prongs or ends adapted to be projected outwardly of the casing. The prongs or ends include cutting blades that terminate in offset clamping jaw ends; the blades having a squeeze ring movable thereover located within the casing to move the ends together as the blades are retracted into the casing. The line is initially threaded through the eye of the hook with the end clamped in the jaws, the line is wound several times around the casing, the end of the casing is passed through the loop in the line, and the end of the line is released and the device withdrawn so the knot formed can be tightened.

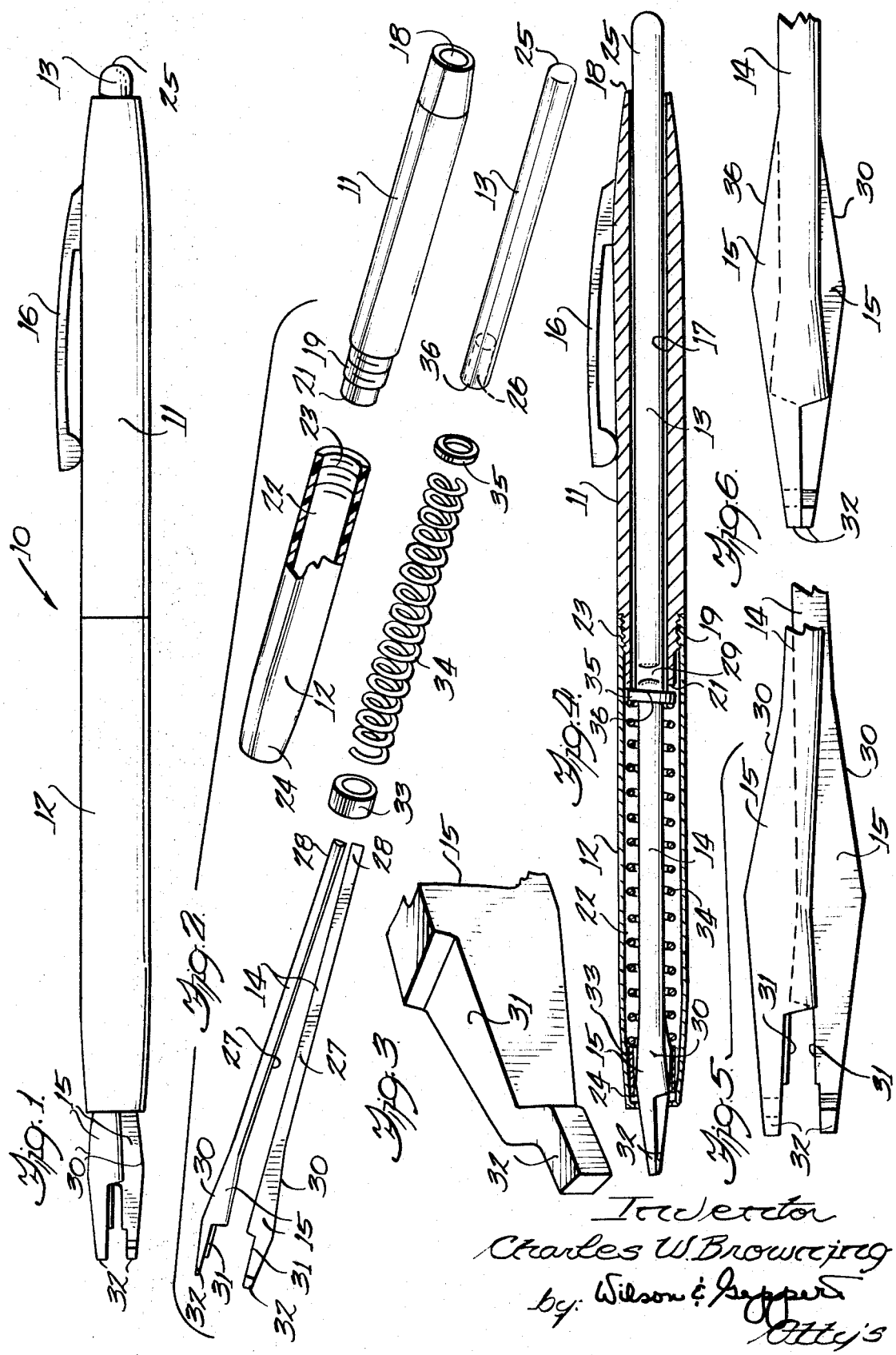

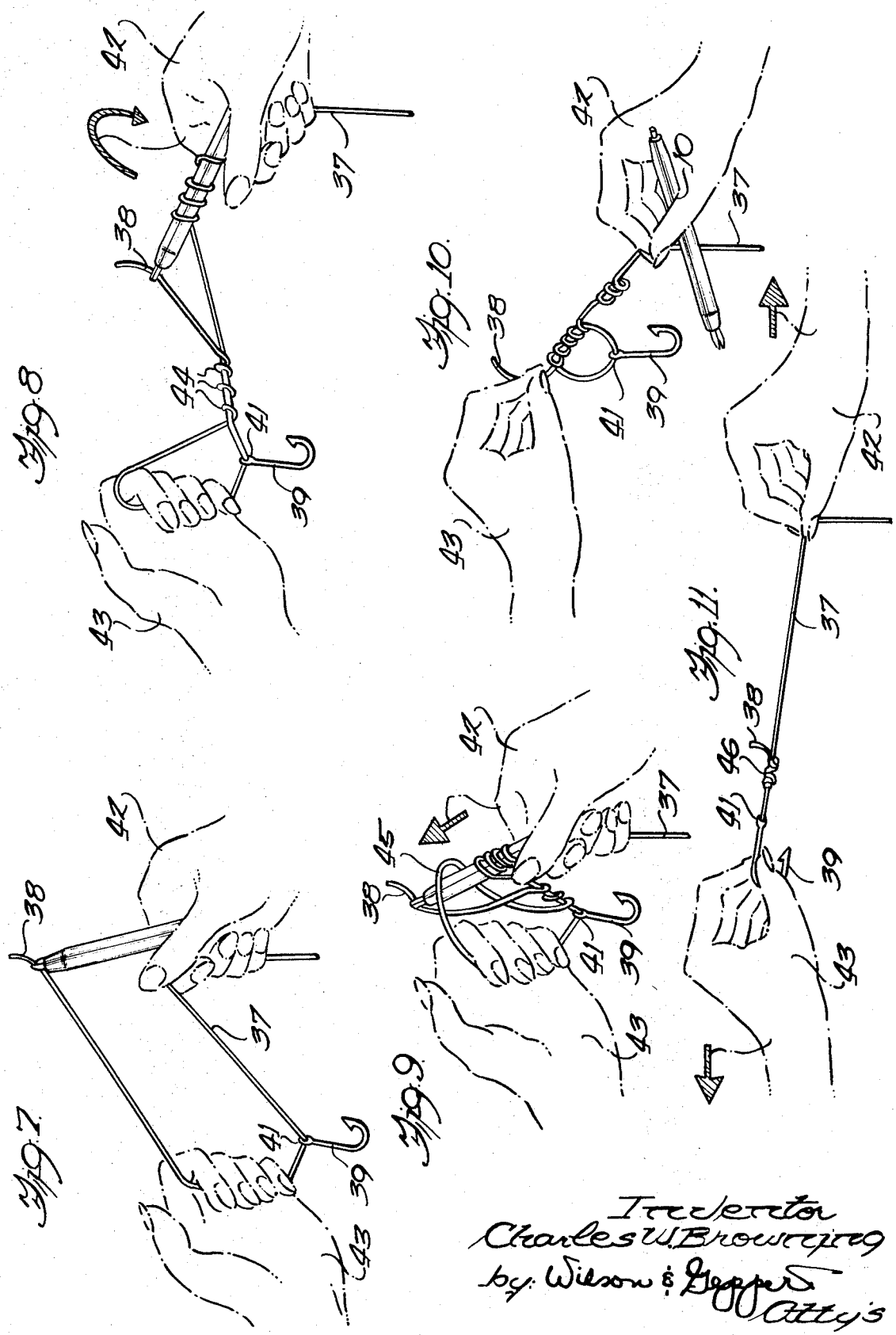

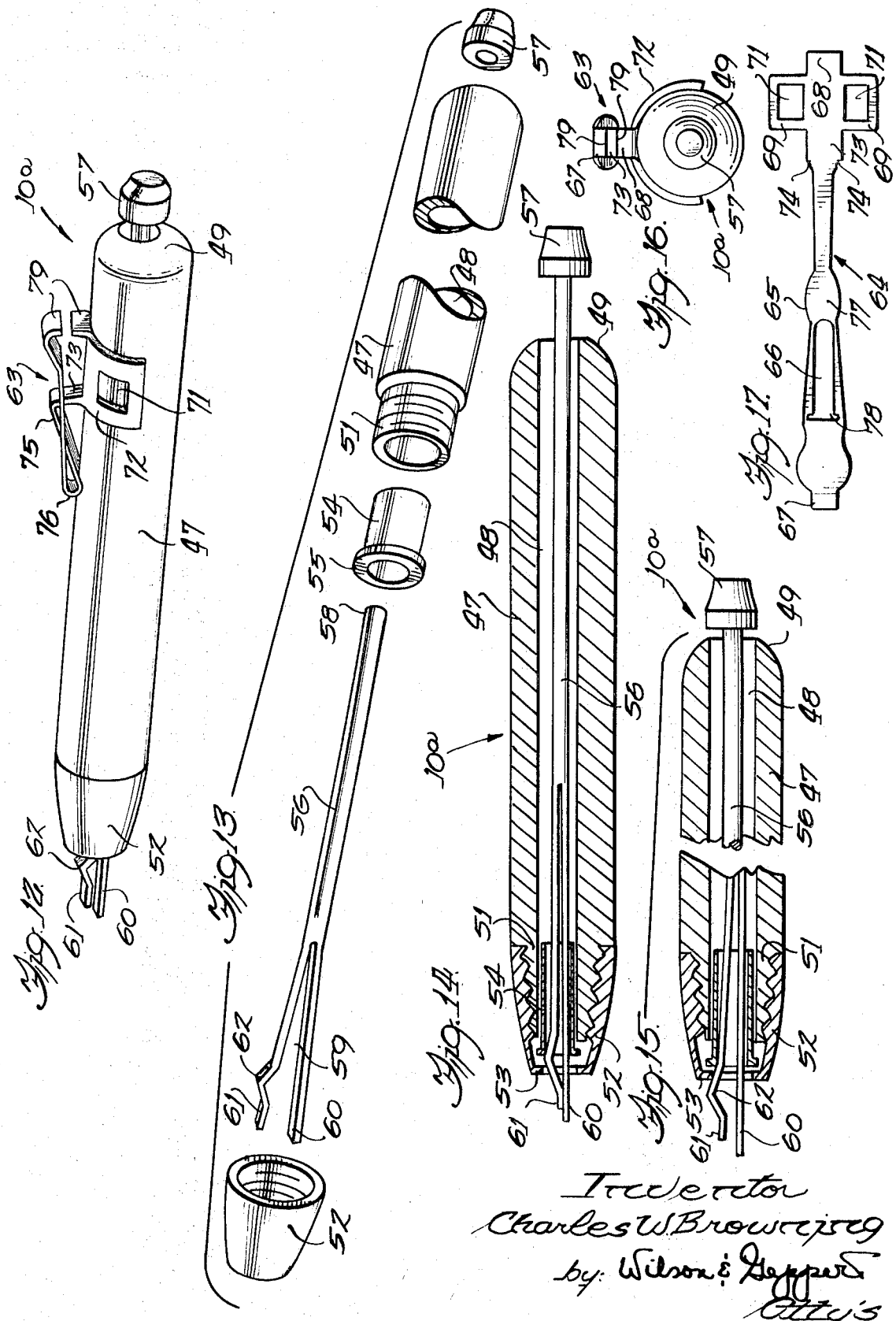

KNOT-TYING DEVICE AND METHOD

The present invention relates to a novel knot-tying device and method of use, and more particularly to a knot-tying device to be utilized in the knotting of a fishing lure or hook on a monofilament or other fishing line.

With the modern monofilament fishing line commonly used today, it requires extreme care and patience to tie a good holding knot in the line to secure a fishing lure or hook thereto. The present invention relates to a knot-tying device and method therefor which the novice is able to use to easily and quickly tie a good holding knot.

Among the objects of the present invention is the provision of a novel knot-tying device which is compact and easily carried and handled; the device being comparable in size to a pen or pencil. The device includes a pair of prongs reciprocably mounted in a casing and terminating at their outer ends in cutting blades and clamping or gripping jaws. An elongated rod in the casing is secured to the prongs and, upon depressing, projects the cutting and clamping jaws from the casing to spread the jaws to grip the line or spread the blades to receive the line for a cutting operation.

Another object of the present invention is the provision of a novel knot-tying device having an elongated casing with a combination line-holding and line-cutting head protruding from one end and a pushbutton operating stem protruding from the opposite end. The line-holding and line-cutting head is formed of a pair of elongated prongs secured at their inner ends to the inner end of the stem, a squeeze ring and a compression spring over the prong shanks, and a washer abutting the upper end of the spring and a shoulder within the casing. The squeeze ring abuts a lower shoulder in the casing and the spring acts to retract the prongs so the squeeze ring engages tapered surfaces on the enlarged head of the prongs to force the prongs together. Depressing the stem causes the prongs to project from the casing and spread apart for a gripping or cutting operation.

A further object of the present invention is the provision of a springless knot-tying device having an elongated stem split at one end for a portion of the stem length to form a pair of clamping jaws, a casing receiving the stem therein, a flared sleeve acting to clamp the jaws together upon manual movement of the stem, and a combination clip for the casing having cutting jaws associated therewith for cutting off excess line once the knot has been formed. The stem is manually actuated in either direction to clamp or unclamp the end of the line during the knot-tying operation.

The present invention also comprehends the provision of a novel knot-tying device and method where, with the use of the device, it is possible to wrap the end of the line around the main line several times without turning the line loose to get a new hold. In the same movement, it also allows the user to insert the end of the line through a formed loop in the twisted line one or more times after wrapping the line without the necessity of turning loose and obtaining a new hold on the line. Also, the device provides positive control and positioning of the end of the line when the user is ready to grasp the end preparatory to pulling the knot tight.

Further objects are to provide a construction of maximum simplicity, efficiency, economy and ease of assembly and operation, and such further objects, advantages and capabilities as will later more fully appear and are inherently possessed thereby. In the drawings:

FIG. 1 is a side elevational view of the knot-tying device of the present invention.

FIG. 2 is an exploded perspective view of the knot-tying device.

FIG. 3 is an enlarged perspective view of the cutting and clamping end of a blade.

FIG. 4 is a longitudinal cross-sectional view through the assembled device and showing the blades in closed position.

FIG. 5 is a partial side elevational view of the blades of the device showing the blades in open position.

FIG. 6 is a side elevational view similar to FIG. 5, but showing the blades in closed position.

FIGS. 7—11 illustrate the sequence of steps taken in the tying of a knot utilizing the device.

FIG. 12 is a perspective view of an alternate embodiment of a springless knot-tying device.

FIG. 13 is an exploded perspective view of the springless knot-tying device.

FIG. 14 is a cross-sectional view through the springless knot-tying device with the clamping jaws closed.

FIG. 15 is a fragmentary cross-sectional view similar to FIG. 14 but with the jaws in open position.

FIG. 16 is an end elevational view of the springless knot-tying device.

FIG. 17 is a plan view of the blank stamped out for folding to form the combination cutter-clip.

Referring more particularly to the disclosure in the drawings wherein are shown illustrative embodiments of the present invention, FIG. 1 discloses a knot-tying device 10 having a casing formed of upper and lower casing parts 11 and 12 which have the general size and appearance of a ballpoint pen. A reciprocable stem 13 extends from one end of the device 10, and a pair of prongs 14,14 are secured to the stem 13 and have their enlarged ends 15,15 projecting from the opposite end of the device. The device 10 may be provided with a spring clip 16, such as provided on a pen or pencil to allow the device 10 to be retained in the pocket of the user.

As seen in FIG. 4, the casing is hollow with the upper casing part 11 having an axial passage 17 therethrough with an upper open end 18 and terminating at the other end in a reduced externally threaded portion 19, the end of which forms a shoulder 21. The lower casing portion 12 also has a central passage 22 therethrough terminating at one end in an internally threaded portion 23 and at the opposite end in an inwardly tapered portion or shoulder 24. The threaded portions 19 and 23 are engaged to secure the two casing portions 11 and 12 together.

The reciprocable stem 13 is an elongated rod having an exposed end 25 and the opposite end has a recess 26 therein. The prongs 14,14 are a pair of elongated members semicircular in cross section with the flat surfaces 27,27 in sliding contact. Each prong 14 is oppositely outwardly bowed as seen in FIG. 2 and has an inner end 28 received in the recess 26 and secured therein by crimping 29. The enlarged end 15 of each prong 14 has a tapered rounded surface 30 with a hollow ground cutting blade or edge 31; the edges or blades may be ground for either right-hand or left-hand orientation. The ends 15 taper downwardly as the end is approached and terminate in offset clamping ends 32,32 adapted to grip a fishing line or other similar line.

A squeeze ring 33 is positioned to encompass the prongs 14,14 adjacent the enlarged heads to cooperate with the tapered surfaces 30,30 to urge the prongs together to a closed position. A compression spring 34 also encompasses the prongs and extends between the squeeze ring 33 and a washer 35. The washer 35 also encompasses the prongs 14,14 and is of such dimensions as to have a smaller internal diameter than the external diameter of the stem 13 forming a shoulder 36, and an external diameter that is larger than the internal diameter of the shoulder 21 on the upper casing portion 11. Thus, the compression spring in the assembled device urges the squeeze ring 33 against the tapered portion or shoulder 24 in the lower casing portion 12 and urges the washer 35 against the shoulder 21 and the stem 13.

To assemble the device, the prongs 14,14 are positioned with their flat sides 27,27 facing each other and the squeeze ring 33 is then placed over the prongs down toward the inner ends 28,28 followed by the compression spring 34 and the washer 35. The stem 13 is crimped onto the ends 28,28 of the prongs 14,14 and this assembly is inserted, prongs first into the lower casing portion 12, and the upper casing portion 11 is moved over the stem 13 and threadingly engages the lower casing portion 12 to secure the casing together.

The compression spring 31 at one end engages the squeeze ring 33 and urges it against the tapered portion or shoulder 24 in the casing portion 12 and at the opposite end engages the washer 35 to urge the washer against the shoulder 36 formed by the stem 13 and urge the stem outwardly to retract the prongs 14,14; with movement of the washer 35 being limited by its engagement with the shoulder 21 and movement of the stem being limited by the enlarged ends 15,15 of the prongs engaging the squeeze ring 33.

The stem 13 and prongs 14,14 are in a free-floating condition, as seen in FIG. 4, and when the jaws 32,32 grip a fishing line, the stem and prongs will swivel within the casing.

When the end 25 of the stem 13 is depressed against the force of the spring 34, the ends 15,15 of the prongs 14, 14 are projected out of the lower casing portion 12 and, as the squeeze ring 33 is retained by the shoulder 24, the squeeze ring is removed from engagement with the tapered surfaces 30,30 so as to allow the blade ends 15,15 to move or spread apart, due to the outward bowing of the prongs, to open the clamping jaws or ends 32,32 and the cutting edges or blades 31,31. With the jaws projected, the stem and prongs will remain fixed and steady and are not free floating. Release of the stem 13 will allow the spring 34 to return the prongs to their closed free-floating position.

FIGS. 7—11 illustrate the use of the knot-tying device 10 for knotting a monofilament fishing line 37 onto a hook or fishing lure 39. As shown in FIG. 7, the end 38 of the line 37 is threaded through the eye 41 of the hook or lure 39 and is gripped by the clamping jaws 32,32 of the device 10. The user grips the device in one hand 42 near the exposed end of the stem and the line so as to leave a loop of line; the user's other hand 43 grasping the line between the end 38 and the lure 39. The line is now wound several times about the device 10 without the user's hands letting go of the loop or the device and line; the free-floating action of the stem and prongs allows the prongs to follow the line without twisting. This results in a series of twists 44 in the loop above the lure (FIG. 8).

With both hands retaining their grip, the end of the device 10 gripping the end 38 of the line 37 is passed once or twice through the loop of line as seen in FIG. 9. With the device 10 extending through the loops 45 of the last-mentioned twists, the user's hand 43 releases the loop and grasps the end 38 of the line 37. The user then depresses the stem 13 to release the end 38 and withdraws the device 10 from the loops formed therearound (FIG. 10). Then, by gripping the line 37 with the hand 42, the loop is diminished until a knot 46 is formed to retain the hook or lure 39 in the line 37 (FIG. 11). The user can then depress the stem 13 and insert the excess end 38 of the line 37 between the spread cutting edges or blades 31,31 and then release the stem so that the cutting edges cut off any excess line adjacent the knot 46.

Except for threading the end 38 of the line 37 through the eye 41 of the hook 39, the knot-tying operation can be performed with heavy gloves on, with the eyes closed or in substantial darkness in view of the ease and simplicity of the threading operation. Also, the monofilament line recited in this embodiment would also include a leader, such as used for fly fishing. Also, this device can be utilized for knot-tying operations other than for fishing equipment where one end of a line of cord must be held during a tying operation.

FIGS. 12—17 disclose an alternate simplified embodiment of the knot-tying device 10$^a$ which is springless and separates the line-clamping and line-cutting functions. The device 10$^a$ includes a casing 47 having a central passage 48 extending axially therethrough. The casing is tapered or rounded at the upper end 49 and externally threaded at the opposite end 51 to receive an internally threaded cap 52. A metal sleeve 54 having a flared end 55 is positioned in the passage 48 with the flared end 55 positioned between the threaded end 51 of the casing 47 and an inwardly extending flange or shoulder 53 at the outer end of the cap 52.

An elongated operator shaft or stem 56 receives a press-on cap 57 at one end 58 and the opposite end is split at 59 for one-fourth to one one-third the length of the stem 56. Splitting the stem 56 forms two semiround prongs or jaws 60, 61, the prong 61 being expanded at 62 to form a taper of sufficient size to prohibit it from sliding all the way through the metal sleeve 54. The taper 62 acts with the sleeve 54 to close the gap between the prongs 60 and 61 when the stem 56 is forced into the sleeve 54.

A combination clip and cutter attachment 63 has a curved body portion 72 that frictionally engages the exterior surface of the casing 47. As seen in FIG. 17, the combined clip and cutter is formed from a single metal stamping 64 having an elongated irregularly shaped portion 65 with a generally triangular opening 66 adjacent the free end 67, and at the other end 68, a pair of flanges 69,69 having cutouts 71,71 curved to form the body portion 72. The elongated portion 65 is bent outwardly away from the body portion 72 at 73 and is bent at the shoulders 74 to form an inwardly curved clip 75 adapted to yieldably engage the casing surface. The portion 65 has a U-bend 76 at the enlarged portion 77 of the blank and the opening 66 receives the curved clip portion 75 adjacent the shoulders 74, 74.

The opening 66 has an enlarged transverse slot 78 at the base of the triangular opening which cooperates with the shoulders 74,74 to form a pivot point. The free end 67 is bent downwardly and the free end 68 is bent upwardly with the edges 79,79 being sharpened or ground to form cutting jaws for the line.

To assemble, the metal sleeve 54 is inserted into the passage 48 with the flared end 55 engaging the threaded end 51 and the cap 52 is screwed onto the casing 47 to hold the metal sleeve 54 in place. The shaft or stem 56 is inserted into the casing 47 through the cap 52 with the end 58 entering first and extending beyond the upper end 49. The cap 57 is pressed onto the end 58 to retain the unit assembled, and the attachment 63 is slipped onto the casing. The stem 56 and the sleeve 54 are free floating in the casing.

To use this embodiment, the end of the line is threaded through the eye in the lure or hook, and the end is clamped between the prongs 60,61. The clamping is accomplished by manually depressing the cap 57 and stem 56 to project the prongs 60,61 from the cap 52 so that the line end can be inserted between the prongs. Then the user manually presses the prongs or jaws 60,61 back into the casing 47 so that the taper 62 cooperating with the sleeve 54 forces the jaws together to clamp the end of the line; the taper 62 also limiting movement of the jaws into the sleeve 54.

Once the end of the line is clamped in the device 10$^a$ the knot is tied in the same manner as shown in FIGS. 7—11. When the knot is completed, excess line is cut off by the cutting edges 79,79 in the clip attachment 63 by manually closing the cutting edges 79,79 with the thumb. Also, by depressing the end 67, the clip 75 is opened by flexing away from the casing 47 if the unit is to be stored on heavy clothing.

I claim:

1. A method of tying a knot adjacent one end of a line to secure an object, such as a fishhook, thereon, which object has an opening receiving the line, comprising the steps of threading the free end of the line through the opening in the object, releasably clamping the end of the line in an elongated tool, grasping the tool and the line with one hand at a point spaced from the end to form a substantial loop, grasping the loop and object with the other hand, winding the loop around the tool while allowing the free end of the line to rotate, passing the clamped line end and tool through the loop at least once without releasing either the loop or the tool, releasing the end of the line and withdrawing the tool, and pulling the end of the line to form a knot.

2. A method as set forth in claim 1, in which the line between the object and the clamped end is wound around the line between the object and the point of grasping the line and the tool as the clamped line end is free to rotate while the loop is wound around the tool, and the tool and clamped end are inserted into the loop as formed by the line being wound about itself.

3. A method as set forth in claim 2, in which said tool and said clamped line end are passed at least twice through the loop prior to release of the line end, withdrawal of the tool and tightening of the knot.

4. A knot-tying device comprising an elongated hollow casing, a stem projecting from one end of the casing and joined to a pair of jaws projecting from the opposite casing end, said jaws being generally parallel and at least one jaw having an enlarged tapered portion adjacent the end thereof, and a sleeve housed within said opposite casing end to rotate therein and cooperate with said tapered portion of the jaws to force the jaws together as the jaws are retracted into the casing, said stem and jaws and said sleeve being freely rotatable in said casing to allow the formation of a knot.

5. A knot-tying device as set forth in claim 4, including a pair of cutting jaws associated with the casing to cut off excess line or ends formed in the tying of the knot.

6. A knot-tying device as set forth in claim 5, including a combination clip and cutter attachment frictionally held onto the exterior surface of the casing, said attachment having a curved body portion with an upturned cutting jaw at one edge and an upturned shouldered portion at the opposite edge, a downwardly and inwardly extending clip at said shouldered portion, an upper cutting arm bent upwardly in a U-bend from the outer end of the clip and terminating in a downturned cutting jaw, said arm having an opening with a slot cooperating with said shoulder portions to form a pivot for the upper cutting jaw, and said clamping jaws being integral with said stem and acting to clamp a line end.

7. A knot-tying device as set forth in claim 4, in which said jaws are formed from a pair of prongs separate from but joined to said stem and terminate in a pair of enlarged ends having complementary cutting surfaces and offset clamping jaws, said prongs being slightly outwardly oppositely bowed, said casing having an internal shoulder adjacent said opposite casing end, said sleeve being a squeeze ring located at said shoulder, and a compression spring encompassing said prongs and urging said squeeze ring against said shoulder.

8. A knot-tying device as set forth in claim 7, in which said casing has a second internal shoulder intermediate its ends, said stem forming a shoulder thereon at the point of juncture with said prongs, and a washer encompassing said prongs at said last-mentioned shoulder and having an external diameter greater than said last-mentioned internal shoulder and an internal diameter smaller than the external diameter of said stem, said spring extending between said washer and said squeeze ring.

9. A knot-tying device as set forth in claim 8, in which said prongs include tapered surfaces adapted to be engaged by said squeeze ring to close the prongs and said spring biases the washer against said stem shoulder and against said last-mentioned internal casing shoulder to retract said prongs into the casing to engage said squeeze ring.